(12) United States Patent
Wakisaka et al.

(10) Patent No.: US 11,376,734 B2
(45) Date of Patent: Jul. 5, 2022

(54) TRAJECTORY CONTROL DEVICE

(71) Applicant: SMC CORPORATION, Tokyo (JP)

(72) Inventors: Shinji Wakisaka, Kunitachi (JP);
Kazuyuki Oguma, Moriya (JP);
Hikaru Yasuda, Moriya (JP)

(73) Assignee: SMC CORPORATION, Tokyo (JP)

( * ) Notice: Subject to any disclaimer, the term of this patent is extended or adjusted under 35 U.S.C. 154(b) by 0 days.

(21) Appl. No.: 17/098,503

(22) Filed: Nov. 16, 2020

(65) Prior Publication Data
US 2021/0154836 A1    May 27, 2021

(30) Foreign Application Priority Data

Nov. 22, 2019 (JP) .............................. JP2019-211058

(51) Int. Cl.
*B25J 9/16* (2006.01)
*B25J 9/02* (2006.01)
(Continued)

(52) U.S. Cl.
CPC ............. *B25J 9/1664* (2013.01); *B25J 9/026* (2013.01); *B25J 13/081* (2013.01);
(Continued)

(58) Field of Classification Search
CPC ........ B25J 9/1664; B25J 9/026; B25J 13/081; B25J 13/08; B25J 19/023; B25J 9/1602;
(Continued)

(56) References Cited

U.S. PATENT DOCUMENTS 4,380,696 A * 4/1983 Masaki ................. B25J 19/023
219/124.34
4,542,328 A * 9/1985 Pouyet ............... G05B 19/4207
318/568.1
(Continued)

FOREIGN PATENT DOCUMENTS

JP       62-88589 A      4/1987
JP       1-252381 A     10/1989
(Continued)

OTHER PUBLICATIONS

Extended European Search Report dated Apr. 15, 2021 in European Patent Application No. 20207782.2, 7 pages.
(Continued)

*Primary Examiner* — Jaime Figueroa
(74) *Attorney, Agent, or Firm* — Oblon, McClelland, Maier & Neustadt, L.L.P.

(57) ABSTRACT

A trajectory control device includes: a contact sensor that can contact side surfaces of a workpiece; an actuator that moves a trajectory tracking member and the contact sensor; and a trajectory controller that calculates XY coordinates of a trajectory on the workpiece that is placed in an arbitrary position, by transforming XY coordinates of the trajectory on the workpiece in a reference position, based on positional information about the side surfaces of the workpiece in the reference position and positional information about the side surfaces of the workpiece placed in the arbitrary position. The positional information about the side surfaces of the workpiece placed in the arbitrary position is obtained by the contact sensor.

7 Claims, 16 Drawing Sheets

(51) Int. Cl.
*B25J 13/08* (2006.01)
*G05B 19/4155* (2006.01)
*G06F 17/11* (2006.01)

(52) U.S. Cl.
CPC .......... *G05B 19/4155* (2013.01); *G06F 17/11* (2013.01); *B25J 9/1692* (2013.01); *G05B 2219/39243* (2013.01)

(58) Field of Classification Search
CPC ........ B25J 9/023; B25J 9/1694; B25J 9/1615; G05B 19/4155; G05B 2219/39243; G05B 2219/40519; G05B 19/19; G05B 2219/35349; G06F 17/11; G01B 5/008; B23K 9/127
USPC .................................................. 700/245–264
See application file for complete search history.

(56) References Cited

U.S. PATENT DOCUMENTS

| | | | | |
|---|---|---|---|---|
| 4,831,549 A | * | 5/1989 | Red | B25J 9/1692 700/254 |
| 4,897,586 A | * | 1/1990 | Nakata | G05B 19/42 318/568.17 |
| 4,947,666 A | * | 8/1990 | Hametner | B21D 5/004 29/407.04 |
| 4,952,772 A | * | 8/1990 | Zana | G05B 19/425 901/42 |
| 5,067,085 A | * | 11/1991 | Wenzel | G05B 19/401 901/44 |
| 5,261,768 A | * | 11/1993 | Loucks | B24B 49/00 409/80 |
| 5,668,453 A | * | 9/1997 | Muto | B25J 9/1679 700/262 |
| 5,908,283 A | * | 6/1999 | Huang | B65G 47/905 414/801 |
| 5,910,894 A | * | 6/1999 | Pryor | G05B 19/41875 700/95 |
| 5,963,711 A | * | 10/1999 | Shimada | B25J 9/1679 901/41 |
| 6,023,645 A | * | 2/2000 | Harima | G05G 15/00 700/250 |
| 6,439,961 B1 | * | 8/2002 | Hammond | B23C 3/12 451/5 |
| 6,704,694 B1 | * | 3/2004 | Basdogan | G06F 3/016 345/184 |
| 7,852,031 B2 | | 12/2010 | Hon et al. | |
| 8,784,155 B2 | * | 7/2014 | Guo | B24B 51/00 451/5 |
| 10,845,776 B2 | * | 11/2020 | Kawamata | G05B 19/4083 |
| 10,946,498 B2 | * | 3/2021 | Mao | B24B 27/0038 |
| 11,059,181 B2 | * | 7/2021 | Shimodaira | B25J 13/06 |
| 2002/0171815 A1 | * | 11/2002 | Matsuyama | G03F 7/70308 355/55 |
| 2005/0159840 A1 | * | 7/2005 | Lin | G05B 19/4163 700/245 |
| 2009/0033655 A1 | * | 2/2009 | Boca | B25J 9/1697 345/419 |
| 2013/0317646 A1 | * | 11/2013 | Kimoto | G05B 19/425 700/250 |
| 2014/0017048 A1 | * | 1/2014 | Mattern | G06T 1/0014 414/567 |
| 2015/0120055 A1 | * | 4/2015 | Miyazawa | B25J 9/1697 901/3 |
| 2016/0379370 A1 | * | 12/2016 | Nakazato | G01B 11/24 382/103 |
| 2018/0056480 A1 | * | 3/2018 | Tegoeh | B24B 49/003 |
| 2018/0194009 A1 | * | 7/2018 | Kojima | B25J 13/085 |
| 2019/0101883 A1 | * | 4/2019 | Kawamata | G01N 21/8851 |
| 2019/0329423 A1 | * | 10/2019 | Shimodaira | B25J 13/06 |

FOREIGN PATENT DOCUMENTS

| | | |
|---|---|---|
| JP | 8-252726 A | 10/1996 |
| JP | 2006-99166 A | 4/2006 |
| JP | 2008-272814 A | 11/2008 |
| JP | 2009-34738 A | 2/2009 |
| JP | 2012-35399 A | 2/2012 |

OTHER PUBLICATIONS

Office Action dated May 10, 2022 issued in corresponding Japanese patent application No. 2019-211058 (w/English translation).

* cited by examiner

FIG. 3

| INPUT DATA FROM MOTOR ENCODERS | | | | T1 |
|---|---|---|---|---|
| A1_X COORDINATE VALUE | $a_1x$ | 10.00 | mm | |
| A1_Y COORDINATE VALUE | $a_1y$ | 40.00 | mm | |
| A2_X COORDINATE VALUE | $a_2x$ | 10.00 | mm | |
| A2_Y COORDINATE VALUE | $a_2y$ | 30.00 | mm | |
| B1_X COORDINATE VALUE | $b_1x$ | 50.00 | mm | |
| B1_Y COORDINATE VALUE | $b_1y$ | 10.00 | mm | |
| B2_X COORDINATE VALUE | $b_2x$ | 40.00 | mm | |
| B2_Y COORDINATE VALUE | $b_2y$ | 10.00 | mm | |
| C1_X COORDINATE VALUE | $c_1x$ | 15.00 | mm | |
| C1_Y COORDINATE VALUE | $c_1y$ | 40.00 | mm | |
| C2_X COORDINATE VALUE | $c_2x$ | 15.00 | mm | |
| C2_Y COORDINATE VALUE | $c_2y$ | 30.00 | mm | |
| D1_X COORDINATE VALUE | $d_1x$ | 50.00 | mm | |
| D1_Y COORDINATE VALUE | $d_1y$ | 17.00 | mm | |
| D2_X COORDINATE VALUE | $d_2x$ | 40.00 | mm | |
| D2_Y COORDINATE VALUE | $d_2y$ | 17.00 | mm | |

FIG. 4

| y=ax+b | a | b | x= | y= |
|---|---|---|---|---|
| A STRAIGHT LINE (A SURFACE) | 0.00 | 0.00 | 10.00 | |
| B STRAIGHT LINE (B SURFACE) | 0.00 | 0.00 | | 10.00 |
| C STRAIGHT LINE (C SURFACE) | 0.00 | 0.00 | 15.00 | |
| D STRAIGHT LINE (D SURFACE) | 0.00 | 0.00 | | 17.00 |

| | a | b | a | b | x | y |
|---|---|---|---|---|---|---|
| A-B STRAIGHT LINES (A-B SURFACES) | 0.00 | 0.00 | 0.00 | 0.00 | 10.00 | 10.00 |
| C-D STRAIGHT LINES (C-D SURFACES) | 0.00 | 0.00 | 0.00 | 0.00 | 15.00 | 17.00 |

T3

| work_tx | work_ty |
|---|---|
| 5.00 | 7.00 |

T4

| | $a_0$ | $b_0$ | $a_2$ | $b_2$ | RADIANS | DEGREES |
|---|---|---|---|---|---|---|
| B-D STRAIGHT LINES (B-D SURFACES) | 0.00 | 0.00 | 0.00 | 0.00 | 0.00 | 0.00 |

| AMOUNT OF MOVEMENT OF REFERENCE POINT BY AFFINE TRANSFORMATION | | T6 |
|---|---|---|
| ANGLE OF ROTATION | 0.00 | |
| X BEFORE MOVEMENT | 10.00 | |
| Y BEFORE MOVEMENT | 10.00 | |
| X AFTER MOVEMENT | 10.00 | |
| Y AFTER MOVEMENT | 10.00 | |
| aff_tx | 0.00 | |
| aff_ty | 0.00 | |

FIG. 7

| AFFINE TRANSFORMATION (COORDINATE TRANSFORMATION) CONDITIONS | | | | T7 |
|---|---|---|---|---|
| X-DIRECTION SCALE | p | 1.00 | TIMES | |
| Y-DIRECTION SCALE | q | 1.00 | TIMES | |
| ANGLE OF ROTATION θ | theta | 0.00 | ° DEGREES | |
| X-DIRECTION AMOUNT OF MOVEMENT | tx | 5.00 | mm | |
| Y-DIRECTION AMOUNT OF MOVEMENT | ty | 7.00 | mm | |
| NUMBER OF DATA | n | 549 | POINTS | |
| X-DIRECTION AMOUNT OF MOVEMENT tx=aff_tx+work_tx | | | | |
| Y-DIRECTION AMOUNT OF MOVEMENT ty=aff_ty+work_ty | | | | |

| TRAJECTORY DATA COORDINATE TRANSFORMATION | | | |
|---|---|---|---|
| BEFORE TRANSFORMATION | | AFTER TRANSFORMATION | |
| x | y | x' | y' |
| 1 | 28.048 | 66.659 | 33.048 | 73.659 |
| 2 | 27.551 | 67.681 | 32.551 | 74.681 |
| 3 | 27.274 | 68.151 | 32.274 | 75.151 |
| 4 | 26.998 | 68.593 | 31.998 | 75.593 |
| 5 | 26.722 | 68.952 | 31.722 | 75.952 |
| 6 | 26.556 | 69.118 | 31.556 | 76.118 |
| 543 | 32.911 | 65.582 | 37.911 | 72.582 |
| 544 | 31.861 | 65.747 | 36.861 | 72.747 |
| 545 | 30.921 | 65.941 | 35.921 | 72.941 |
| 546 | 29.402 | 66.3 | 34.402 | 73.3 |
| 547 | 28.407 | 66.549 | 33.407 | 73.549 |
| 548 | 28.076 | 66.659 | 33.076 | 73.659 |
| 549 | 28.048 | 66.659 | 33.048 | 73.659 |

TRAJECTORY DATA COORDINATE TRANSFORMATION

FIG. 10

| INPUT DATA FROM MOTOR ENCODERS | | | | T1 |
|---|---|---|---|---|
| A1_X COORDINATE VALUE | $a_1x$ | 10.00 | mm | |
| A1_Y COORDINATE VALUE | $a_1y$ | 40.00 | mm | |
| A2_X COORDINATE VALUE | $a_2x$ | 10.00 | mm | |
| A2_Y COORDINATE VALUE | $a_2y$ | 30.00 | mm | |
| B1_X COORDINATE VALUE | $b_1x$ | 50.00 | mm | |
| B1_Y COORDINATE VALUE | $b_1y$ | 10.00 | mm | |
| B2_X COORDINATE VALUE | $b_2x$ | 40.00 | mm | |
| B2_Y COORDINATE VALUE | $b_2y$ | 10.00 | mm | |
| C1_X COORDINATE VALUE | $c_1x$ | 30.00 | mm | |
| C1_Y COORDINATE VALUE | $c_1y$ | 40.00 | mm | |
| C2_X COORDINATE VALUE | $c_2x$ | 33.00 | mm | |
| C2_Y COORDINATE VALUE | $c_2y$ | 30.00 | mm | |
| D1_X COORDINATE VALUE | $d_1x$ | 50.00 | mm | |
| D1_Y COORDINATE VALUE | $d_1y$ | 23.00 | mm | |
| D2_X COORDINATE VALUE | $d_2x$ | 40.00 | mm | |
| D2_Y COORDINATE VALUE | $d_2y$ | 20.00 | mm | |

FIG. 11

| y=ax+b | a | b | x= | y= | —T2 |
|---|---|---|---|---|---|
| A STRAIGHT LINE (A SURFACE) | 0.00 | 0.00 | 10.00 | | |
| B STRAIGHT LINE (B SURFACE) | 0.00 | 0.00 | | 10.00 | |
| C STRAIGHT LINE (C SURFACE) | -3.33 | 140.00 | | | |
| D STRAIGHT LINE (D SURFACE) | 0.30 | 8.00 | | | |

FIG. 12

| | a | b | a | b | x | y | |
|---|---|---|---|---|---|---|---|
| A-B STRAIGHT LINES (A-B SURFACES) | 0.00 | 0.00 | 0.00 | 0.00 | 10.00 | 10.00 | — T3 |
| C-D STRAIGHT LINES (C-D SURFACES) | -3.33 | 140.00 | 0.30 | 8.00 | 36.33 | 18.90 | |

| work_tx | work_ty | |
|---|---|---|
| 26.33 | 8.90 | — T4 |

| | $a_0$ | $b_0$ | $a_2$ | $b_2$ | RADIANS | DEGREES | |
|---|---|---|---|---|---|---|---|
| B-D STRAIGHT LINES (B-D SURFACES) | 0.00 | 0.00 | 0.30 | 8.00 | 0.29 | 16.70 | — T5 |

FIG. 13

| AMOUNT OF MOVEMENT OF REFERENCE POINT BY AFFINE TRANSFORMATION | | T6 |
|---|---|---|
| ANGLE OF ROTATION | 16.70 | |
| X BEFORE MOVEMENT | 10.00 | |
| Y BEFORE MOVEMENT | 10.00 | |
| X AFTER MOVEMENT | 6.70 | |
| Y AFTER MOVEMENT | 12.45 | |
| aff_tx | 3.30 | |
| aff_ty | -2.45 | |

FIG. 14

| AFFINE TRANSFORMATION (COORDINATE TRANSFORMATION) CONDITIONS |||| T7 |
|---|---|---|---|
| X-DIRECTION SCALE | p | 1.00 | TIMES |
| Y-DIRECTION SCALE | q | 1.00 | TIMES |
| ANGLE OF ROTATION θ | theta | 16.70 | ° DEGREES |
| X-DIRECTION AMOUNT OF MOVEMENT | tx | 29.63 | mm |
| Y-DIRECTION AMOUNT OF MOVEMENT | ty | 6.45 | mm |
| NUMBER OF DATA | n | 549 | POINTS |
| X-DIRECTION AMOUNT OF MOVEMENT tx=aff_tx+work_tx ||||
| Y-DIRECTION AMOUNT OF MOVEMENT ty=aff_ty+work_ty ||||

| WORKPIECE ALIGNMENT COORDINATE TRANSFORMATION | | | | |
|---|---|---|---|---|
| COORDINATE POINT | BEFORE TRANSFORMATION | | AFTER TRANSFORMATION | |
| | x | y | x' | y' |
| REFERENCE POINT (LOWER LEFT) 1 | 10.00 | 10.00 | 36.33 | 18.90 |
| 2 | 90.00 | 10.00 | 112.96 | 41.89 |
| 3 | 90.00 | 90.00 | 89.97 | 118.51 |
| 4 | 10.00 | 90.00 | 13.34 | 95.53 |
| REFERENCE POINT (LOWER LEFT) 5 | 10.00 | 10.00 | 36.33 | 18.90 |

| | TRAJECTORY DATA COORDINATE TRANSFORMATION | | | |
|---|---|---|---|---|
| | BEFORE TRANSFORMATION | | AFTER TRANSFORMATION | |
| | x | y | x' | y' |
| 1 | 28.048 | 66.659 | 37.336 | 78.355 |
| 2 | 27.551 | 67.681 | 36.566 | 79.191 |
| 3 | 27.274 | 68.151 | 36.167 | 79.561 |
| 4 | 26.998 | 68.593 | 35.775 | 79.905 |
| 5 | 26.722 | 68.952 | 35.407 | 80.17 |
| 6 | 26.556 | 69.118 | 35.201 | 80.281 |
| 543 | 32.911 | 65.582 | 42.303 | 78.72 |
| 544 | 31.861 | 65.747 | 41.25 | 78.577 |
| 545 | 30.921 | 65.941 | 40.295 | 78.492 |
| 546 | 29.402 | 66.3 | 38.736 | 78.4 |
| 547 | 28.407 | 66.549 | 37.712 | 78.352 |
| 548 | 28.076 | 66.659 | 37.363 | 78.363 |
| 549 | 28.048 | 66.659 | 37.336 | 78.355 |

TRAJECTORY CONTROL DEVICE

CROSS-REFERENCE TO RELATED APPLICATION

This application is based upon and claims the benefit of priority from Japanese Patent Application No. 2019-211058 filed on Nov. 22, 2019, the contents of which are incorporated herein by reference.

BACKGROUND OF THE INVENTION

Field of the Invention

The present invention relates to a trajectory control device for moving a member such as a dispenser along a trajectory on a workpiece.

Description of the Related Art

Trajectory control in operations such as line application with dispensers, welding, and so on using industrial robots utilizes sensor technologies such as high-resolution cameras, image sensors, and so on, in order to detect the position of the trajectory and correct trajectory error caused by positional displacement of the workpiece.

For example, Japanese Laid-Open Patent Publication No. 2008-272814 describes a robot system that performs a tracking control of correcting the position of a welding torch while detecting the position of the welding line using a sensor capable of radiating laser slit light.

SUMMARY OF THE INVENTION

However, using a high-resolution camera or image sensor requires introducing an expensive and complicated system.

The present invention has been devised considering such a situation, and an object of the present invention is to provide a trajectory control device capable of performing trajectory correction by recognizing positional displacement and the amount of movement of a workpiece, without using a high-precision camera or image sensor.

An aspect of the present invention is directed to a trajectory control device for moving a trajectory tracking member along a trajectory on a workpiece that is placed in an arbitrary position. The trajectory control device includes: a contact sensor configured to contact side surfaces of the workpiece; an actuator configured to move the trajectory tracking member and the contact sensor; and a trajectory controller configured to calculate XY coordinates of the trajectory on the workpiece placed in the arbitrary position, by transforming XY coordinates of the trajectory on the workpiece in a reference position, based on positional information about the side surfaces of the workpiece in the reference position and positional information about the side surfaces of the workpiece placed in the arbitrary position. The positional information about the side surfaces of the workpiece placed in the arbitrary position is obtained by the contact sensor.

According to the trajectory control device, it is possible to obtain XY coordinates of a trajectory on a workpiece that is placed in an arbitrary position by means of a simple method without using a high-precision camera or image sensor.

The trajectory control device of the invention calculates the XY coordinates of the trajectory on the workpiece placed in an arbitrary position from known data indicating XY coordinates of the trajectory on the workpiece in a reference position, based on positional information about side surfaces of the workpiece that is obtained by the contact sensor. Accordingly, it is possible to obtain the XY coordinates of the trajectory on the workpiece placed in the arbitrary position by means of a simple method without using a high-precision camera or image sensor.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3 is a diagram illustrating data that is stored in a control table T1 in a specific example in which a workpiece has moved without rotating;

FIG. 4 is a diagram illustrating data that is stored in a control table T2 in the specific example of FIG. 3;

FIG. 5 is a diagram illustrating data that is stored in control tables T3 to T5 in the specific example of FIG. 3;

FIG. 6 is a diagram illustrating data that is stored in a control table T6 in the specific example of FIG. 3;

FIG. 7 is a diagram illustrating data that is stored in a control table T7 in the specific example of FIG. 3;

FIG. 10 is a diagram illustrating data that is stored in the control table T1 in a specific example in which a workpiece has moved with rotating;

FIG. 11 is a diagram illustrating data that is stored in the control table T2 in the specific example of FIG. 10;

FIG. 12 is a diagram illustrating data that is stored in the control tables T3 to T5 in the specific example of FIG. 10;

FIG. 13 is a diagram illustrating data that is stored in the control table T6 in the specific example of FIG. 10;

FIG. 14 is a diagram illustrating data that is stored in the control table T7 in the specific example of FIG. 10;

DESCRIPTION OF THE PREFERRED EMBODIMENTS

The trajectory control device of the invention will be described below in connection with preferred embodiments while referring to the accompanying drawings.

Figure 1:
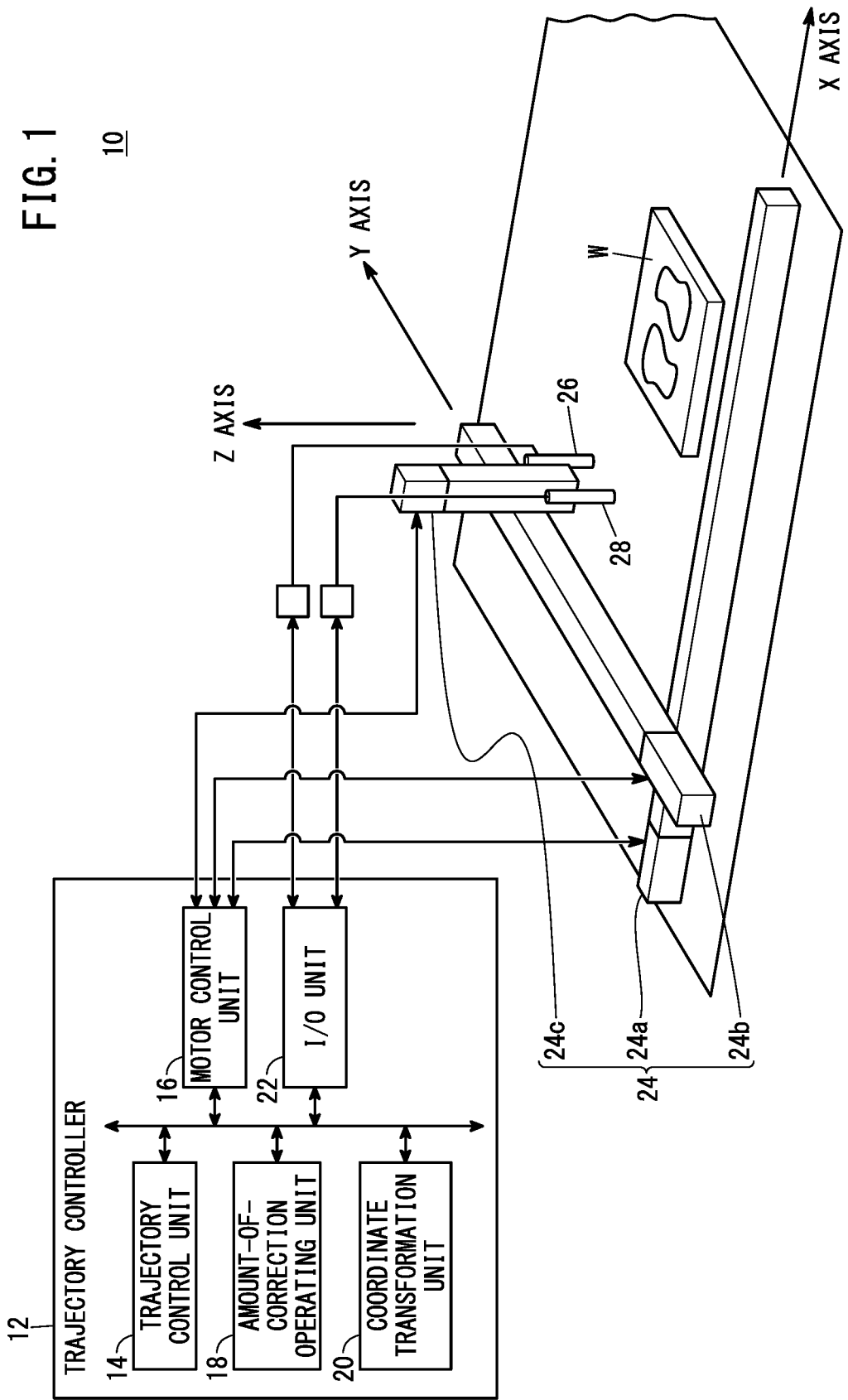
FIG. 1 is a conceptual diagram of a trajectory control device according to an embodiment of the present invention.

As shown in FIG. 1, a trajectory control device 10 includes a trajectory controller 12, a contact sensor 26, a trajectory tracking member 28, and a group of electric actuators 24. The trajectory controller 12 includes a trajectory control unit 14, a motor control unit 16, an amount-of-correction operating unit 18, a coordinate transformation unit 20, and an I/O unit (input/output unit) 22. Each unit of the trajectory controller 12 is realized by one or multiple pieces of hardware and software.

The trajectory controller 12, mainly the trajectory control unit 14, performs a detection control to detect the position of a workpiece W by moving the contact sensor 26 by driving the group of electric actuators 24, and also performs a trajectory control to move the trajectory tracking member 28 along a trajectory on the workpiece by driving the group of electric actuators 24.

The contact sensor 26 detects the position of the workpiece W by mechanically contacting side surfaces of the workpiece W. The trajectory tracking member 28 is a member corresponding to the tip of a welding gun, or the tip of a dispenser nozzle for supplying adhesive or seal material, and is attached to a device installed on a welding line or application line.

The group of electric actuators 24 includes an X-axis actuator 24a, a Y-axis actuator 24b, and a Z-axis actuator 24c. The contact sensor 26 and the trajectory tracking member 28 are both attached to the Z-axis actuator 24c. The X-axis actuator 24a and the Y-axis actuator 24b serve to move the contact sensor 26 and the trajectory tracking member 28 to an arbitrary position in the plane of the XY coordinate system.

The Z-axis actuator 24c serves to adjust the positions of the contact sensor 26 and the trajectory tracking member 28 along the Z-axis direction (up-down direction). When the trajectory controller 12 performs the detection control, the contact sensor 26 moves downward to an operating position, while the trajectory tracking member 28 moves upward to a withdrawn position. On the other hand, when the trajectory controller 12 performs the trajectory control, the trajectory tracking member 28 moves downward to an operating position, while the contact sensor 26 moves upward to a withdrawn position.

The trajectory control unit 14 holds trajectory control data including data relating to the trajectory on the workpiece and motor control data. The trajectory data is electronic data such as DXF files created by CAD, and is formed of attribute commands such as Polyline and Arc and XY coordinate data. The motor control data is electronic data indicating the position, speed, acceleration, and so on of the X-axis actuator 24a, the Y-axis actuator 24b, and the Z-axis actuator 24c.

The trajectory control unit 14 further holds XY coordinate data that represents a plane configuration of the workpiece W (which will be referred to as "workpiece alignment" hereinafter), as well as attribute data relating to side surfaces and a reference point of the workpiece W. The workpiece alignment at least includes data relating to two side surfaces that are adjacent to each other with the reference point therebetween.

The motor control unit 16 updates and holds, in real time, encoder values sent from motor encoders of the X-axis actuator 24a and the Y-axis actuator 24b, as positional data of these actuators, and drives and controls the X-axis actuator 24a and the Y-axis actuator 24b on the basis of the trajectory control data from the trajectory control unit 14.

The amount-of-correction operating unit 18 calculates the amount of correction (correction coefficients) of the trajectory on the workpiece, based on positional information about the side surfaces of the workpiece detected by the contact sensor 26. The coordinate transformation unit 20 calculates coordinates of the trajectory on the workpiece that is placed in an arbitrary position, based on the amount of correction (correction coefficients) calculated by the amount-of-correction operating unit 18. The I/O unit 22 serves to establish synchronization with peripheral devices, and the trajectory tracking member 28 and the contact sensor 26 are connected to the I/O unit 22.

In the detection control, the trajectory controller 12 drives the X-axis actuator 24a and the Y-axis actuator 24b to move the contact sensor 26 in a direction toward a side surface of the workpiece W. When the contact sensor 26 comes in contact with the side surface of the workpiece W, then the contact sensor 26 notifies the trajectory controller 12 through the I/O unit 22 about the contact. When the trajectory controller 12 recognizes that the contact sensor 26 has come in contact with the side surface of the workpiece W, then the trajectory controller 12 stops the X-axis actuator 24a and the Y-axis actuator 24b.

Next, the trajectory controller 12 reads the motor encoder value of the X-axis actuator 24a and the motor encoder value of the Y-axis actuator 24b from the motor control unit 16, and holds the contact point of the contact sensor 26 on the side surface of the workpiece W as XY coordinate data.

This series of operations is repeated so as to obtain XY coordinate data of different two contact points on one side surface of the workpiece W. In the same way, this series of operations is repeated also for another side surface of the workpiece W so as to obtain XY coordinate data of different two contact points on this side surface. The position at which these two side surfaces of the workpiece W intersect is defined as the reference point.

Figure 2:
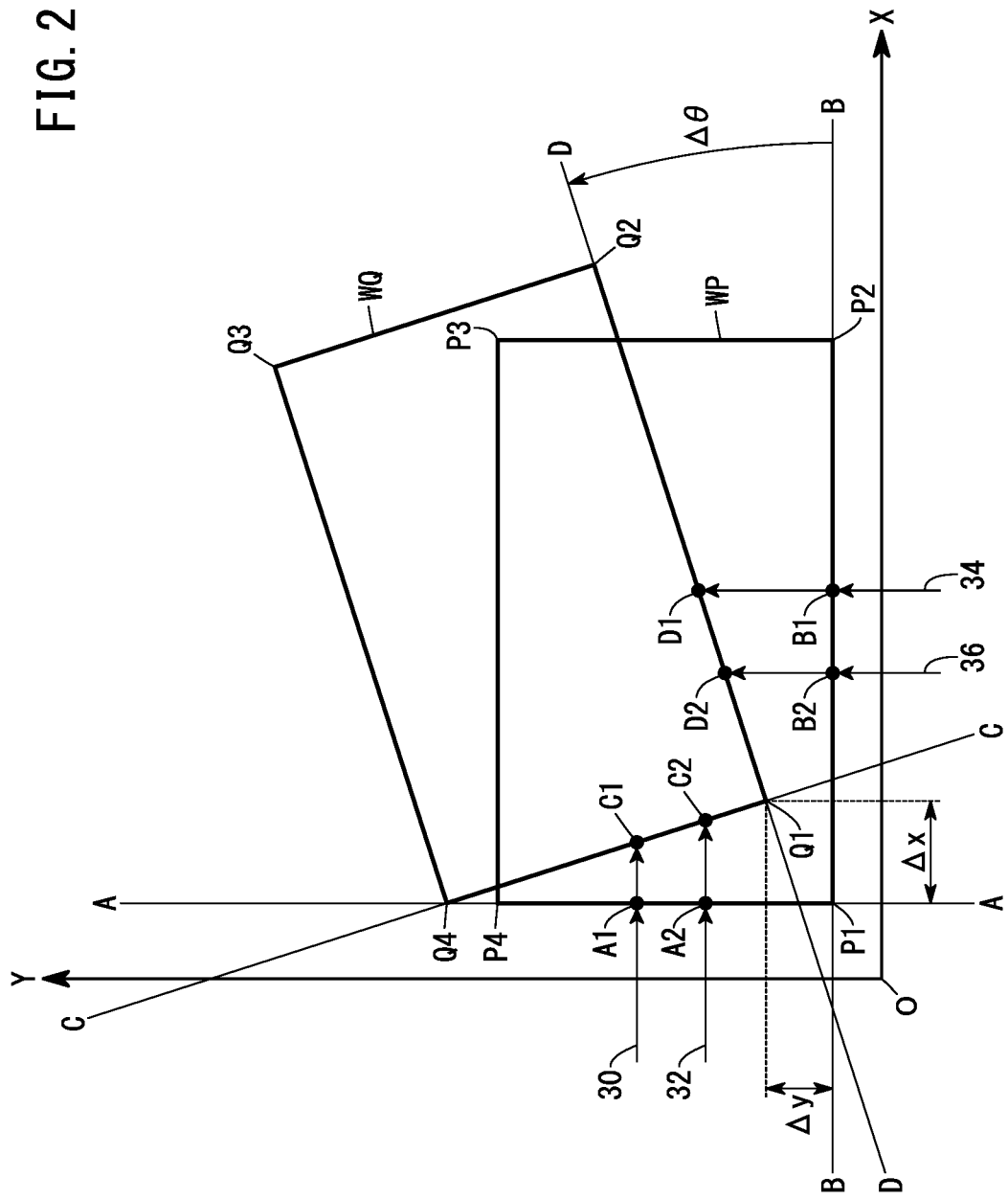
FIG. 2 is a diagram illustrating an XY coordinate system of the trajectory control device of FIG. 1 and a workpiece placed therein.

FIG. 2 is a diagram illustrating the XY coordinate system of the trajectory control device 10 viewed from right above, and the position of the workpiece W placed thereon, and is used to explain operations of the amount-of-correction operating unit 18.

In the XY coordinate system, the four side surfaces of the cuboidal workpiece W placed in a reference position is represented by the line connecting a point P1 and a point P2, the line connecting the point P2 and a point P3, the line connecting the point P3 and a point P4, and the line connecting the point P4 and the point P1. Among the four points P1 to P4, the point P1 is the reference point. Hereinafter, the side surface represented by the line connecting the point P4 and the point P1 is referred to as a workpiece side surface A, and the side surface represented by the line connecting the point P1 and the point P2 is referred to as a workpiece side surface B.

In this embodiment, the reference position is the position where the workpiece W is placed in such a manner that the workpiece side surface A is parallel to the Y axis and the workpiece side surface B is parallel to the X axis. However, for example, the reference position may be a position where the workpiece W is placed in such a manner that the workpiece side surface A and the workpiece side surface B are neither parallel to the X axis nor to the Y axis.

The plane configuration of the target workpiece W need not necessarily be rectangular, as long as the contour thereof has two straight line parts. In other words, it works if the side surfaces of the workpiece W have at least two flat surface portions. One or multiple pieces of trajectory data may exist in the rectangular range of the workpiece alignment, or may exist outside of the rectangular range of the workpiece alignment. Further, a plurality of workpieces W may be fixed to a single tray.

Now, referring to FIG. 2, the detection control will be described more specifically. Because a workpiece alignment WP (P1-P2-P3-P4) placed in the reference position is previously held in the trajectory controller 12, it is not necessary to detect the position of the side surfaces of the workpiece. However, here, the description will be given assuming that the workpiece W is first placed in the reference position. Accordingly, in practice, the detection of the side surfaces of the workpiece may be omitted for the workpiece W placed in the reference position.

The contact sensor 26 advances in a first movement direction 30 that is parallel to the X axis, stops when it reaches a point A1 on the workpiece side surface A, and detects and holds the X coordinate and the Y coordinate of the point A1. In the same way, the contact sensor 26 advances in a second movement direction 32 that is parallel to the X axis, stops when it reaches a point A2 on the workpiece side surface A, and detects and holds the X coordinate and the Y coordinate of the point A2. In this embodiment, the first movement direction 30 is a direction along the straight line that is expressed as y=40, and the second movement direction 32 is a direction along the straight line that is expressed as y=30.

Further, the contact sensor 26 advances in a third movement direction 34 that is parallel to the Y axis, stops when it reaches a point B1 on the workpiece side surface B, and detects and holds the X coordinate and the Y coordinate of the point B1. In the same way, the contact sensor 26 advances in a fourth movement direction 36 that is parallel to the Y axis, stops when it reaches a point B2 on the workpiece side surface B, and detects and holds the X coordinate and the Y coordinate of the point B2. In this embodiment, the third movement direction 34 is a direction along the straight line that is expressed as x=50, and the fourth movement direction 36 is a direction along the straight line that is expressed as x=40.

In this embodiment, the equation of the straight line passing through A1 and A2 is given as x=10, and the equation of the straight line passing through B1 and B2 is given as y=10. The intersection of these two straight lines is the reference point P1, and the XY coordinates of the reference point P1 are (10, 10). As to these two straight lines, if a line passing through two points is expressed by a general expression y=ax+b, then a coefficient "a" and a coefficient "b" are both treated as zero (a=0, b=0).

Next, a workpiece alignment WQ that is placed in an arbitrary position will be described. The workpiece alignment WQ placed in an arbitrary position includes points Q1 to Q4 that correspond respectively to the four points P1 to P4 of the workpiece alignment WP placed in the reference position. Hereinafter, the side surface represented by the line connecting the point Q4 and the point Q1 is referred to as a workpiece side surface C, and the side surface represented by the line connecting the point Q1 and the point Q2 is referred to as a workpiece side surface D.

The contact sensor 26 advances in the aforementioned first movement direction 30 (y=40) that is parallel to the X axis, stops when it reaches a point C1 on the workpiece side surface C corresponding to the workpiece side surface A in the reference position, and detects and holds the X coordinate and the Y coordinate of the point C1. In the same way, the contact sensor 26 advances in the aforementioned second movement direction 32 (y=30) that is parallel to the X axis, stops when it reaches a point C2 on the workpiece side surface C, and detects and holds the X coordinate and the Y coordinate of the point C2.

Further, the contact sensor 26 advances in the aforementioned third movement direction 34 (x=50) that is parallel to the Y axis, stops when it reaches a point D1 on the workpiece side surface D corresponding to the workpiece side surface B in the reference position, and detects and holds the X coordinate and the Y coordinate of the point D1. In the same way, the contact sensor 26 advances in the aforementioned fourth movement direction 36 (x=40) that is parallel to the Y axis, stops when it reaches a point D2 on the workpiece side surface D, and detects and holds the X coordinate and the Y coordinate of the point D2.

The equation of the straight line passing through C1 and C2 is given as $y=a_1x+b_1$, and the equation of the straight line passing through D1 and D2 is given as $y=a_2x+b_2$ $(a_1 \neq a_2)$. The intersection of these two straight lines is a point Q1 to which the reference point P1 has moved. That is, the reference point P1 moves to the point Q1 when the workpiece W placed in the reference position moves to the arbitrary position. The XY coordinates (x1, y1) of the point Q1 can be calculated by the equations below.

$$x1=(b_2-b_1)/(a_1-a_2)$$

$$y1=(a_1b_2-a_2b_1)/(a_1-a_2)$$

If the XY coordinates of the reference point P1 are expressed as (x0, y0) and the amount of movement from the reference point P1 to the point Q1 (x1, y1) is expressed as an amount of movement Δx of the X coordinate and an amount of movement Δy of the Y coordinate, then Δx=x1−x0 and Δy=y1−y0. In this embodiment, x0=10 and y0=10, and therefore Δx=x1−10 and Δy=y1−10.

If the straight line representing the workpiece side surface B placed in the reference position is given as $y=a_0+b_0$, then a gradient angle Δθ that is formed by the workpiece side surface D after movement and the workpiece side surface B in the reference position can be calculated by the equation below, based on this straight line and the straight line $y=a_2x+b_2$ representing the workpiece side surface D placed in the arbitrary position.

$$\Delta\theta=\tan^{-1}((a_2-a_0)/(1+a_0a_2))$$

In this embodiment, $a_0=0$ and therefore $\Delta\theta=\tan^{-1}a_2$.

The trajectory data after movement can be obtained by calculation from the trajectory data in the reference position if the amount of movement Δx of the X coordinate of the reference point P1, the amount of movement Δy of the Y coordinate of the reference point P1, and the gradient angle Δθ have been detected.

Referring to FIGS. 3 to 16, a specific method for the trajectory control will be described separately in a case where the workpiece W has moved from the reference position without rotating (positional displacement) and a case where the workpiece W has moved from the reference position with rotating (positional displacement).

[Specific Example without Rotation]

First, referring to FIGS. 3 to 9, a specific example will be described in which the workpiece W has moved from a reference position without rotating. It is assumed that the reference position of the workpiece W is the same as that shown in FIG. 2.

As shown in FIG. 3, the control table T1 stores XY coordinate data about the four points A1, A2, B1 and B2 on the workpiece alignment WP in the reference position, and XY coordinate data about the four points C1, C2, D1 and D2 on the workpiece alignment WQ after having moved.

Based on the XY coordinate data in the control table T1, the equation of the straight line passing through A1 and A2, the equation of the straight line passing through B1 and B2, the equation of the straight line passing through C1 and C2, and the equation of the straight line passing through D1 and D2, are obtained and stored in a control table T2 as shown in FIG. 4. These four straight lines correspond to the workpiece side surface A, the workpiece side surface B, the workpiece side surface C, and the workpiece side surface D, respectively.

In this specific example, the straight line passing through A1 and A2 (A straight line) and the straight line passing through C1 and C2 (C straight line) are both parallel to the Y axis, and the straight line passing through B1 and B2 (B straight line) and the straight line passing through D1 and D2 (D straight line) are both parallel to the X axis. The workpiece side surface A (A surface) is stored as x=10.00, the workpiece side surface B (B surface) is stored as y=10.00, the workpiece side surface C (C surface) is stored as x=15.00, and the workpiece side surface D (D surface) is stored as y=17.00. Further, as to these four straight lines, the coefficient "a" and the coefficient "b" in the general expression of straight line y=ax+b are all stored as zero (0.00).

Based on the equations of the straight lines in the control table T2, the XY coordinates of the intersection of the workpiece side surface A and the workpiece side surface B, and the XY coordinates of the intersection of the workpiece side surface C and the workpiece side surface D, are obtained and stored in a control table T3 as shown in FIG. 5. The data stored in the control table T3 indicates that the X coordinate and Y coordinate of the intersection of the workpiece side surface A and the workpiece side surface B, i.e., the reference point P1 (x0, y0), are both 10.00. Also, the data indicates that the X coordinate and Y coordinate of the intersection of the workpiece side surface C and the workpiece side surface D, i.e., the point Q1 (x1, y1) to which the reference point P1 has moved, are 15.00 and 17.00, respectively.

The amount of movement Δx of the X coordinate and the amount of movement Δy of the Y coordinate from the reference point P1 (x0, y0) to the point Q1 (x1, y1) are given as Δx=x1−x0=5.00 and Δy=y1−y0=7.00, respectively. As shown in FIG. 5, the value of the amount of movement Δx of the X coordinate is stored in a control table T4 as an X-coordinate amount of movement (work_tx) of the workpiece W, and the value of the amount of movement Δy of the Y coordinate is stored in the control table T4 as a Y-coordinate amount of movement (work_ty) of the workpiece W.

Further, if the straight line that represents the workpiece side surface B in the reference position is given as y=$a_0$x+$b_0$ and the straight line that represents the workpiece side surface D after movement is given as y=$a_2$x+$b_2$, then, as stated earlier, the gradient angle Δθ of the workpiece side surface D with respect to the workpiece side surface B can be calculated by the equation below.

$$\Delta\theta = \tan^{-1}((a_2-a_0)/(1+a_0 a_2))$$

In this specific example, $a_0$=0 and $a_2$=0, and therefore Δθ=0, which is, as shown in FIG. 5, stored in a control table T5 as 0.00 radians and 0.00 degrees.

If the amount of movement Δx of the X coordinate of the reference point P1, the amount of movement Δy of the Y coordinate of the reference point P1, and the gradient angle Δθ of the workpiece side surface after movement with respect to the workpiece side surface in the reference position are known, then the XY coordinate data of the trajectory after having moved can be obtained by calculation from the XY coordinate data of the trajectory at the time when the workpiece W is in the reference position. As mentioned earlier, the XY coordinate data of the trajectory at the time when the workpiece W is in the reference position are held in the trajectory control unit 14.

Specifically, the XY coordinates (x', y') of the trajectory after movement can be calculated by the following equations by performing a coordinate transformation called affine transformation on the XY coordinates (x, y) of the trajectory in the reference position.

$$x'=(p)(x)\text{Cos}(\Delta\theta)-(q)(y)\text{Sin}(\Delta\theta)+tx$$

$$y'=(p)(x)\text{Sin}(\Delta\theta)+(q)(y)\text{Cos}(\Delta\theta)+ty$$

Now, p=1 and q=1, assuming that the workpiece size is not enlarged or reduced. Further, since the coordinate transformation is performed through rotation about the origin (0, 0) of the XY coordinate system, first, the amount of movement tx in the X direction and the amount of movement ty in the Y direction are set at zero in the affine transformation expressions (tx=0, ty=0), and then an amount of movement aff_tx of the X coordinate and an amount of movement aff_ty of the Y coordinate of the reference point by the affine transformation are calculated.

In this specific example, Δθ=0. Accordingly, x=10, y=10 and Δθ=0 are substituted into the following expressions, and then the X coordinate and Y coordinate of the reference point P1 (10, 10) after movement by the affine transformation are both calculated to be 10.

$$X \text{ coordinate after movement}=(x)\text{Cos}(\Delta\theta)-(y)\text{Sin}(\Delta\theta)$$

$$Y \text{ coordinate after movement}=(x)\text{Sin}(\Delta\theta)+(y)\text{Cos}(\Delta\theta)$$

The amount of movement aff_tx of the X coordinate and the amount of movement aff_ty of the Y coordinate of the reference point by the affine transformation are obtained as follows (the XY coordinates before movement are the XY coordinates of the reference point P1).

aff_tx=X coordinate before movement−X coordinate after movement=10−10=0 aff_ty=Y coordinate before movement−Y coordinate after movement=10−10=0

As shown in FIG. 6, these values are stored in a control table T6 as 0.00.

Thus, a rotation angle θ=0.00 (degrees),

X-direction amount of movement tx=aff_tx+work_tx=0.00+5.00=5.00

Y-direction amount of movement ty=aff_ty+work_ty=0.00+7.00=7.00

In this way, the affine transformation (coordinate transformation) conditions for calculating the trajectory data after movement are obtained and stored in a control table T7 as shown in FIG. 7.

Figure 8:
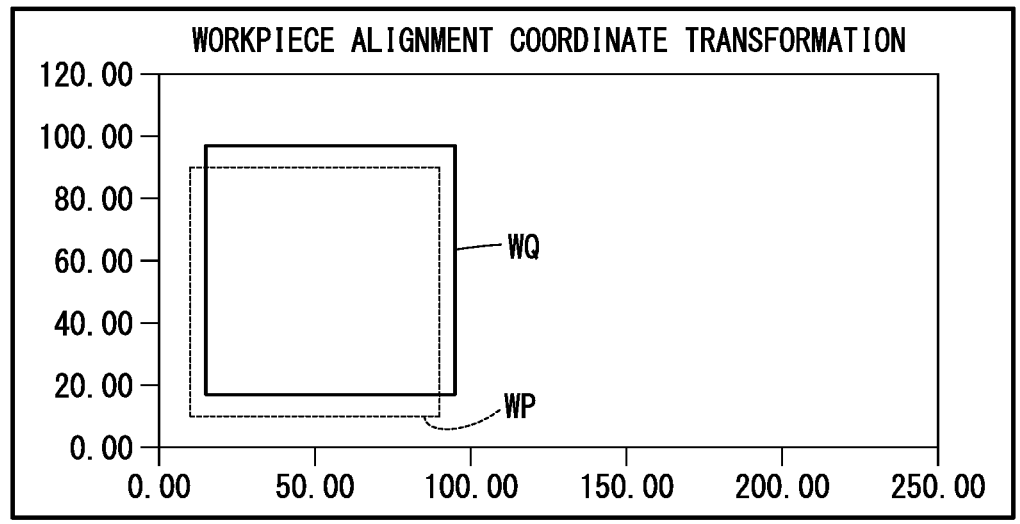
FIG. 8 is a diagram illustrating the results of a coordinate transformation of a workpiece alignment in the specific example of FIG. 3.

FIG. 8 shows the results of the coordinate transformation of the workpiece alignments. In FIG. 8, the dotted line shows the workpiece alignment WP in the reference position and the solid line shows the workpiece alignment WQ after movement.

Figure 9:
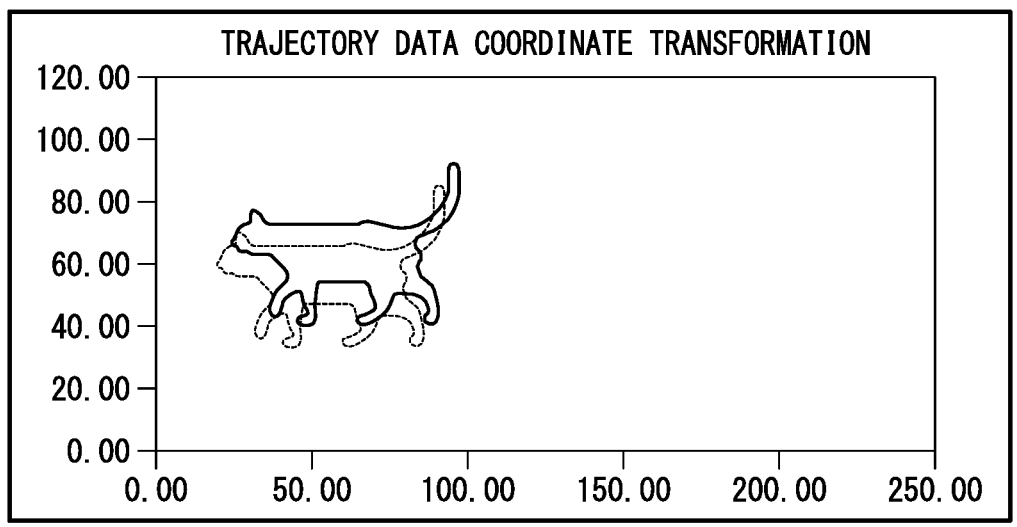
FIG. 9 is a diagram illustrating the results of a coordinate transformation of trajectory data in the specific example of FIG. 3.

Further, FIG. 9 shows the results of the coordinate transformation of the trajectory data. In FIG. 9, the dotted line shows the trajectory in the reference position and the solid line shows the trajectory after movement.

[Specific Example with Rotation]

Next, referring to FIGS. 10 to 16, a specific example will be described in which the workpiece W has moved from a reference position with rotating. It is assumed that the reference position of the workpiece W is the same as that shown in FIG. 2.

As shown in FIG. 10, the control table T1 stores the XY coordinate data about the four points A1, A2, B1 and B2 on the workpiece alignment WP in the reference position, and the XY coordinate data about the four points C1, C2, D1 and D2 on the workpiece alignment WQ after having moved.

Based on the XY coordinate data in the control table T1, the equation of the straight line passing through A1 and A2, the equation of the straight line passing through B1 and B2, the equation of the straight line passing through C1 and C2, and the equation of the straight line passing through D1 and D2, are obtained and stored in the control table T2 as shown in FIG. 11. These four straight lines correspond to the workpiece side surface A, the workpiece side surface B, the workpiece side surface C, and the workpiece side surface D, respectively.

In this specific example, the straight line passing through A1 and A2 (A straight line) is parallel to the Y axis, and the straight line passing through B1 and B2 (B straight line) is parallel to the X axis. The workpiece side surface A (A surface) is stored as x=10.00 and the workpiece side surface B (B surface) is stored as y=10.00. Further, as to these two straight lines, the coefficient "a" and the coefficient "b" in the general expression of straight line y=ax+b are all stored as zero (0.00).

On the other hand, the straight line passing through C1 and C2 (C straight line) and the straight line passing through D1 and D2 (D straight line) are neither parallel to the X axis nor to the Y axis. The workpiece side surface C (C surface) is given as y=−3.33x+140, and the value of the coefficient "a" and the value of the coefficient "b" in the general expression of straight line y=ax+b are stored as −3.33 and 140.00, respectively. Further, the workpiece side surface D (D surface) is given as y=0.3x+8 and the value of the coefficient "a" is stored as 0.30 and the value of the coefficient "b" is stored as 8.00.

Based on the equations of the straight lines in the control table T2, the XY coordinates of the intersection of the workpiece side surface A and the workpiece side surface B, and the XY coordinates of the intersection of the workpiece side surface C and the workpiece side surface D, are obtained and stored in the control table T3 as shown in FIG. 12. The data stored in the control table T3 indicates that the X coordinate and Y coordinate of the intersection of the workpiece side surface A and the workpiece side surface B, i.e., the reference point P1 (x0, y0), are both 10.00. Also, the data indicates that the X coordinate and Y coordinate of the intersection of the workpiece side surface C and the workpiece side surface D, i.e., the point Q1 (x1, y1) to which the reference point P1 has moved, are 36.33 and 18.90, respectively.

The amount of movement Δx of the X coordinate and the amount of movement Δy of the Y coordinate from the reference point P1 (x0, y0) to the point Q1 (x1, y1) are given as Δx=x1−x0=26.33 and Δy=y1−y0=8.90, respectively. As shown in FIG. 12, the value of the amount of movement Δx of the X coordinate is stored as work_tx in the control table T4, and the value of the amount of movement Δy of the Y coordinate is stored as work_ty in the control table T4.

Further, if the straight line that represents the workpiece side surface B in the reference position is given as $y=a_0x+b_0$ and the straight line that represents the workpiece side surface D after movement is given as $y=a_2x+b_2$, then, as stated earlier, the gradient angle Δθ of the workpiece side surface D with respect to the workpiece side surface B can be calculated by the equation below.

$$\Delta\theta = \tan^{-1}((a_2-a_0)/(1+a_0a_2))$$

In this specific example, $a_0=0$ and $a_2=0.30$, and therefore Δθ=0.29, which is, as shown in FIG. 12, stored in the control table T5 as 0.29 radians and 16.70 degrees.

As has been explained above, the XY coordinates (x', y') of the trajectory after movement can be calculated by the following equations by performing the affine transformation on the XY coordinates (x, y) of the trajectory in the reference position.

$$x'=(p)(x)\cos(\Delta\theta)-(q)(y)\sin(\Delta\theta)+tx$$

$$y'=(p)(x)\sin(\Delta\theta)+(q)(y)\cos(\Delta\theta)+ty$$

Now, p=1 and q=1, assuming that the workpiece size is not enlarged or reduced. Further, since the coordinate transformation is performed through rotation about the origin (0, 0) of the XY coordinate system, the amount of movement tx in the X direction and the amount of movement ty in the Y direction are set at zero in the affine transformation expressions (tx=0, ty=0), and then the amount of movement aff_tx of the X coordinate and the amount of movement aff_ty of the Y coordinate of the reference point by the affine transformation are calculated.

In this specific example, Δθ=0.29 radians. Accordingly, x=10, y=10 and Δθ=0.29 are substituted into the following expressions, and then the X coordinate and Y coordinate of the reference point P1 (10, 10) after movement by the affine transformation are calculated to be 6.70 and 12.45, respectively.

$$X \text{ coordinate after movement}=(x)\cos(\Delta\theta)-(y)\sin(\Delta\theta)$$

$$Y \text{ coordinate after movement}=(x)\sin(\Delta\theta)+(y)\cos(\Delta\theta)$$

The amount of movement aff_tx of the X coordinate and the amount of movement aff_ty of the Y coordinate of the reference point by the affine transformation are obtained as follows (the XY coordinates before movement are the XY coordinates of the reference point P1).

$$\text{aff\_}tx = X \text{ coordinate before movement} - X \text{ coordinate after movement}=10-6.70=3.30$$

$$\text{aff\_}ty = Y \text{ coordinate before movement} - Y \text{ coordinate after movement}=10-12.45=-2.45$$

As shown in FIG. 13, these values are stored in the control table T6.

Seen from a different perspective, the amount of movement of the reference point by the affine transformation is for adjustment of the difference between the XY coordinates after rotation in the case where a coordinate point (x, y) in the XY coordinate system is rotated by Δθ about the origin of the XY coordinate system, and those in the case where it is rotated by Δθ about the reference point, and the amount of movement of the reference point by the affine transformation takes constant values corresponding to the value of Δθ and the values of the XY coordinates of the reference point, irrespective of the position of the coordinate point (x, y). Then, the amount of movement aff_tx of the X coordinate of the reference point by the affine transformation can be obtained by calculating the difference between the X coordinate of the reference point P1 and the X coordinate of the reference point P1 rotated by Δθ about the origin of the XY coordinate system. In the same way, the amount of movement aff_ty of the Y coordinate of the reference point by the affine transformation can be obtained by calculating the difference between the Y coordinate of the reference point P1 and the Y coordinate of the reference point P1 rotated by Δθ about the origin of the XY coordinate system.

Thus, the rotation angle θ=16.70 (degrees), $$X\text{-direction amount of movement } tx=\text{aff\_}tx+\text{work\_}tx=3.30+26.33=29.63$$

$$Y\text{-direction amount of movement } ty=\text{aff\_}ty+\text{work\_}ty=-2.45+8.90=6.45$$

In this way, the affine transformation (coordinate transformation) conditions for calculating the trajectory data after movement are obtained and stored in the control table T7 as shown in FIG. 14.

Figure 15:
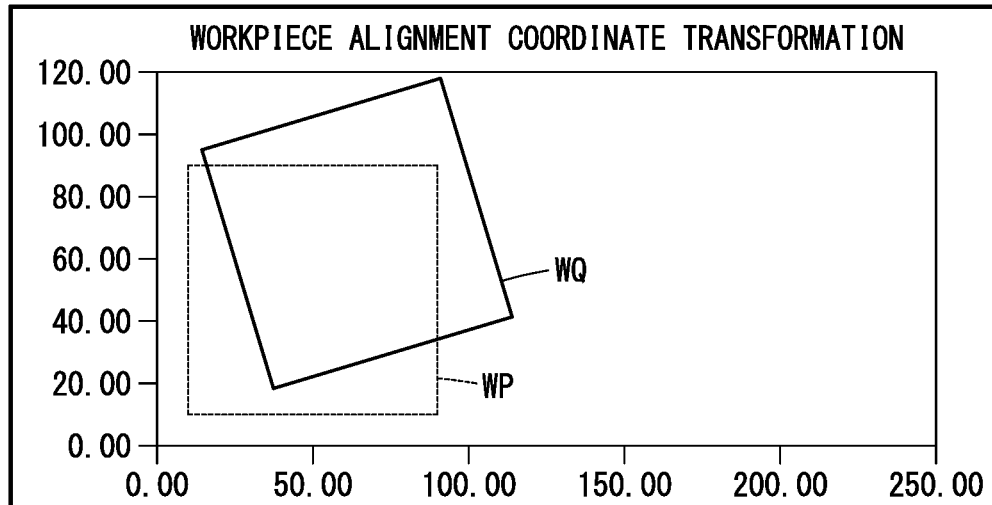
FIG. 15 is a diagram illustrating the results of a coordinate transformation of a workpiece alignment in the specific example of FIG. 10.

FIG. 15 shows the results of the coordinate transformation of the workpiece alignments. In FIG. 15, the dotted line shows the workpiece alignment WP in the reference position and the solid line shows the workpiece alignment WQ after movement.

Figure 16:
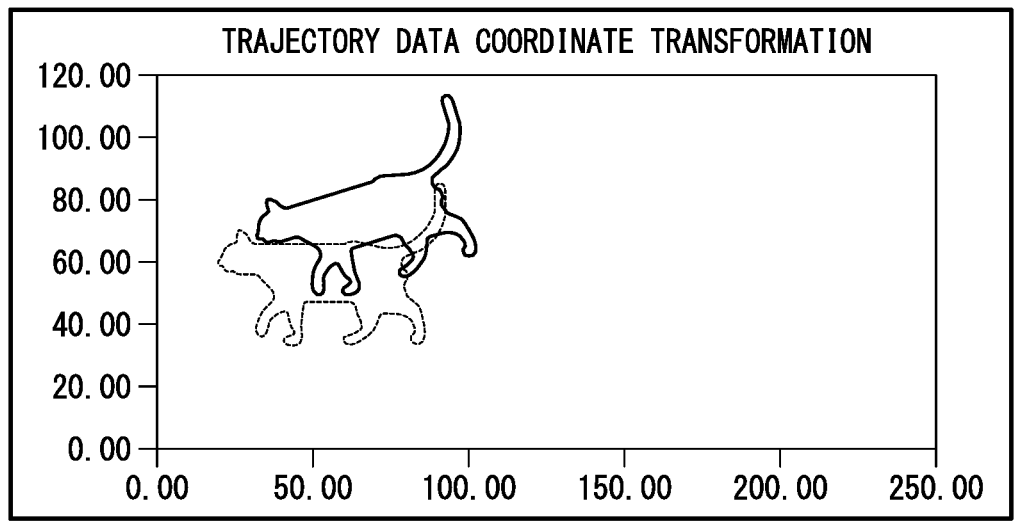
FIG. 16 is a diagram illustrating the results of a coordinate transformation of trajectory data in the specific example of FIG. 10.

Further, FIG. 16 shows the results of the coordinate transformation of the trajectory data. In FIG. 16, the dotted line shows the trajectory in the reference position and the solid line shows the trajectory after movement.

Thus, the trajectory control device 10 of the embodiment can obtain the amount of movement Δx of the X coordinate of the reference point P1, the amount of movement Δy of the Y coordinate of the reference point P1, and the gradient angle Δθ of a workpiece side surface after movement with respect to the workpiece side surface in the reference position, by means of a simple detection control using the contact sensor 26, without using a high-precision camera or image sensor, and can correct the trajectory in real time on the basis of these pieces of data.

More specifically, if the XY coordinates of two contact points of the contact sensor 26 on the workpiece side surface C and the XY coordinates of two contact points of the contact sensor 26 on the workpiece side surface D are known, then the amount of movement Δx of the X coordinate, the amount of movement Δy of the Y coordinate, and the gradient angle Δθ can be obtained, and then the XY coordinates of the trajectory on the workpiece placed in an arbitrary position can be easily calculated by using the affine transformation.

Further, the contact sensor 26 and the trajectory tracking member 28 are both attached to the Z-axis actuator 24c, and therefore the contact sensor 26 and the trajectory tracking member 28 can be driven by the same mechanism.

Furthermore, the X-axis actuator 24a and the Y-axis actuator 24b are stopped when the contact sensor 26 comes in contact with the workpiece side surface C or workpiece side surface D, which prevents the workpiece W placed in the arbitrary position from moving during the detection control.

The trajectory control device of the present invention is not limited to the embodiments described above, but can of course adopt various configurations without departing from the essence and gist of the present invention.

What is claimed is:

1. A trajectory control device for moving a trajectory tracking member along a trajectory on a workpiece that is placed in an arbitrary position, the trajectory control device comprising:

a contact sensor configured to contact side surfaces of the workpiece;

an actuator configured to move the trajectory tracking member and the contact sensor; and a trajectory controller configured to calculate XY coordinates of the trajectory on the workpiece placed in the arbitrary position, by transforming XY coordinates of the trajectory on the workpiece in a reference position, based on positional information about the side surfaces of the workpiece in the reference position and positional information about the side surfaces of the workpiece placed in the arbitrary position, wherein the positional information about the side surfaces of the workpiece placed in the arbitrary position is obtained by the contact sensor, wherein the trajectory controller detects XY coordinates of two contact points on one side surface of the workpiece by driving the actuator to advance the contact sensor in two movement directions that are parallel to an X axis, and detects XY coordinates of two contact points on another side surface of the workpiece by driving the actuator to advance the contact sensor in two movement directions that are parallel to a Y axis, and wherein the trajectory controller obtains an equation of a first straight line that passes through the two contact points on the one side surface of the workpiece and an equation of a second straight line that passes through the two contact points on the another side surface of the workpiece, further obtains XY coordinates of an intersection of the first straight line and the second straight line, then calculates an amount of movement of an X coordinate and an amount of movement of a Y coordinate of a reference point of the workpiece, and also calculates a gradient angle of the another side surface of the workpiece with respect to the reference position of the workpiece.

2. The trajectory control device according to claim 1, wherein the actuator includes an X-axis actuator, a Y-axis actuator, and a Z-axis actuator, and the contact sensor and the trajectory tracking member are attached to the Z-axis actuator.

3. The trajectory control device according to claim 2, wherein positions of the contact sensor and the trajectory tracking member in a Z-axis direction are adjusted by driving the Z-axis actuator in such a manner that the trajectory tracking member moves to a withdrawn position when the contact sensor moves to an operating position, and the contact sensor moves to a withdrawn position when the trajectory tracking member moves to an operating position.

4. The trajectory control device according to claim 1, wherein the trajectory controller stops the actuator when the contact sensor comes in contact with the one side surface or the another side surface.

5. The trajectory control device according to claim 1, wherein the XY coordinates of the trajectory on the workpiece placed in the arbitrary position are calculated by using an affine transformation, based on the amount of movement of the X coordinate of the reference point of the workpiece, the amount of movement of the Y coordinate of the reference point of the workpiece, and the gradient angle.

6. The trajectory control device according to claim 5, wherein the affine transformation is performed by following equations (meanings of letters and signs in the equations are shown below):

$$x' = (x)\text{Cos}(\Delta\theta) - (y)\text{Sin}(\Delta\theta) + tx$$

$$y' = (x)\text{Sin}(\Delta\theta) + (y)\text{Cos}(\Delta\theta) + ty$$

where x': the X coordinate of the trajectory on the workpiece placed in the arbitrary position, y': the Y coordinate of the trajectory on the workpiece placed in the arbitrary position, x: the X coordinate of the trajectory on the workpiece in the reference position, y: the Y coordinate of the trajectory on the workpiece in the reference position, Δθ: the gradient angle, tx: the amount of movement of the X coordinate of the reference point of the workpiece plus the amount of movement of the X coordinate of the reference point by the affine transformation, and ty: the amount of movement of the Y coordinate of the reference point of the workpiece plus the amount of movement of the Y coordinate of the reference point by the affine transformation.

7. The trajectory control device according to claim 6, wherein the amount of movement of the X coordinate of the reference point by the affine transformation is a calculated difference between the X coordinate of the reference point and the X coordinate of the reference point rotated by the gradient angle $\Delta\theta$ about an origin of an XY coordinate system, and the amount of movement of the Y coordinate of the reference point by the affine transformation is a calculated difference between the Y coordinate of the reference point and the Y coordinate of the reference point rotated by the gradient angle $\Delta\theta$ about the origin of the XY coordinate system.

* * * * *